(12) United States Patent
Suzuki et al.

(10) Patent No.: US 7,012,704 B2
(45) Date of Patent: Mar. 14, 2006

(54) POSITION DETECTING DEVICE

(75) Inventors: Akihiro Suzuki, Saitama (JP); Tadayoshi Cho, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/089,342

(22) Filed: Mar. 25, 2005

(65) Prior Publication Data

US 2005/0213111 A1 Sep. 29, 2005

(30) Foreign Application Priority Data

Mar. 29, 2004 (JP) ............................ P2004-096450

(51) Int. Cl.
*G01B 11/14* (2006.01)
*G01D 5/34* (2006.01)
*G03B 17/00* (2006.01)

(52) U.S. Cl. ................. 356/617; 356/614; 250/231.13; 250/208; 396/53

(58) Field of Classification Search ........ 356/614–617, 356/622–624; 250/231.13, 231.14, 231.16, 250/231.17, 237 G, 208.1; 318/568.19, 632; 701/208, 211; 369/53, 55

See application file for complete search history.

(56) References Cited

U.S. PATENT DOCUMENTS

| | | | |
|---|---|---|---|
| 4,709,209 A * | 11/1987 | Murakami et al. ........ | 178/18.07 |
| 5,525,885 A * | 6/1996 | Sato ........................... | 318/632 |
| 5,913,918 A * | 6/1999 | Nakano et al. .............. | 701/208 |
| 5,978,600 A * | 11/1999 | Takeuchi et al. .............. | 396/53 |
| RE37,969 E * | 1/2003 | Horton et al. .......... | 250/231.13 |
| 6,664,535 B1 * | 12/2003 | Nahum et al. ......... | 250/231.14 |
| 2004/0104703 A1 * | 6/2004 | Aiso et al. ............. | 318/568.19 |

FOREIGN PATENT DOCUMENTS

JP         7230031        8/1995

* cited by examiner

*Primary Examiner*—Zandra V. Smith
*Assistant Examiner*—Sang H. Nguyen
(74) *Attorney, Agent, or Firm*—Harness, Dickey & Pierce, P.L.C.

(57) ABSTRACT

A position detecting device in which a count value is incremented or decremented on the basis of a pulse output from an encoder every predetermined shift amount of a control target to thereby detect a current value representing a current position of the control target as the count value, is characterized by comprising: initialization signal output means for outputting an initialization signal representing an initialization position at plural positions of a movable range of the control target when the movable range of the control target is restricted, or at plural positions of an operating range of integer times of a period when the movable range of the control target is not restricted and the same state is repeated at the period concerned; current value storing means for storing, in association with identification information for identifying each initialization signal, the current value of the control target at each position where the initialization signal is output by each initialization signal output means; and count value setting means for moving the control target to a position where some initialization signal is output from the initialization signal output means at the initialization time of the count value, and achieving the current value corresponding to identification information for identifying the initialization signal from the current value storage means, and setting the current value thus achieved as the count value.

14 Claims, 6 Drawing Sheets

FIG. 5

| Z-PHASE | Z1 | Z2 | Z3 | Z4 | Z5 | Z6 | Z7 | Z8 |
|---|---|---|---|---|---|---|---|---|
| A/D CONVERSION VALUE OF POTENTIOMETER | 1000H | 2000H | 3000H | 4000H | 5000H | 6000H | 7000H | 8000H |
| A/B-PHASE COUNT VALUE OF ROTARY ENCODER | 1500H | 2500H | 3500H | 4500H | 5500H | 6500H | 7500H | 8500H |

POSITION DETECTING DEVICE

BACKGROUND OF THE INVENTION

1. Technical Field of the Invention

The present invention relates to a position detecting device, and particularly to a position detecting device used to detect the position of a control target in a servo device.

2. Description of the Related Art

A servo device (servo circuit) for servo-driving a motor in accordance with an instruction signal from a controller has been hitherto used in a lens driving operation of a television lens, a pan/tilt driving operation of a camera platform for supporting the television camera or the like. The servo circuit uses a position detecting sensor for detecting the position of a control target to be driven by the motor, and a potentiometer or encoder has been hitherto used as such a position detecting sensor. JP-A-7-230031 describes a position detecting device using a potentiometer.

However, in connection with a case where a potentiometer is used as a position detecting sensor and a case where an encoder is used as a position detecting sensor, the servo circuit required to have high-precision control has the following drawbacks, respectively. That is, when the potentiometer is used as the position detecting sensor, a high-precision potentiometer is needed, which increases the cost. Furthermore, even the high-precision potentiometer has a limitation in the linearity of an output voltage to a detected position (detected angle), and thus the precision of the position detection is restricted. Furthermore, when digital processing is needed, it is required to convert the output voltage of the potentiometer to a digital signal by an A/D converter, and thus the A/D converter is also required to have high precision, resulting in increase in cost.

On the other hand, for example when an incremental type encoder (hereinafter referred to merely as encoder) is used as the encoder, it can carry out high-precision position detection cheaply without any drawback imposed on the potentiometer. However, in order to make the count value of the number of pulses output from the encoder the absolute value (the value indicating the absolute value) corresponding to the position, it is required to carry out an original-point returning operation in which a control target is temporarily moved to the end of a movable range when power is turned on and the count value is initialized to zero, or when the encoder is an encoder with a zero position signal (Z-phase), the control target is moved until the zero position signal thereof is detected and the count value is initialized to zero. Therefore, there is a drawback that a time needed for the original-point returning operation is needed when power is turned on.

An absolute type encoder for outputting the absolute value corresponding to the position as in the case of the potentiometer is known as needing no original-point returning operation. When the absolute type encoder is used, it is required to have high resolution, and thus it has a drawback that the cost is increased. Furthermore, there is also a limit in the resolution of the absolute type encoder, and also it needs parallel outputs. Therefore, it has a drawback that there are required cables and input terminals whose numbers correspond to the number of bits. The present invention has been implemented in view of the foregoing situation.

SUMMARY OF THE INVENTION

An object of the invention is to provide a position detecting device which can carry out high-precision and high-resolution position detection by using an incremental type encoder and also carry out initialization processing in a short time when power is turned on, so that position detection can be effectively performed just after the power is turned on.

The object can be attained by adoption of the following constitution, thereby achieving the invention.

(1) A position detecting device in which a count value is incremented or decremented on the basis of a pulse output from an encoder every predetermined shift amount of a control target to thereby detect a current value representing a current position of the control target as the count value, is characterized by comprising: initialization signal output means for outputting an initialization signal representing an initialization position at plural positions of a movable range of the control target when the movable range of the control target is restricted, or at plural positions of an operating range of integer times of a period when the movable range of the control target is not restricted and the same state is repeated at the period concerned; current value storing means for storing, in association with identification information for identifying each initialization signal, the current value of the control target at each position where the initialization signal is output by each initialization signal output means; and count value setting means for moving the control target to a position where some initialization signal is output from the initialization signal output means at the initialization time of the count value, and achieving the current value corresponding to identification information for identifying the initialization signal from the current value storage means, and setting the current value thus achieved as the count value.

According to the present invention, the incremental type encoder is used, and thus the position detection can be carried out inexpensively with high precision and high resolution. Furthermore, in the initialization of the count value of the encoder when power is turned on, the control target is moved to a position at which a desired initialization signal is output without moving the control target greatly, whereby the count value can be properly set to the predetermined value corresponding to the position of the control target. Therefore, the initialization of the count value can be performed in a short time, and the position detection can be effectively carried out just after power is turned on.

(2) The position detecting device is preferably characterized in that in the invention of (1), each initialization signal output from the initialization signal output means is a zero position signal output from the encoder. There is an encoder outputting a Z-phase pulse representing a zero position signal, and the zero position signal is used as the initialization signal.

(3) The position detecting device is preferably characterized in the invention of (1) or (2), the identification information for identifying each initialization signal output from the initialization signal output means is an output value of a position detecting sensor for outputting a signal whose value corresponds to the position of the control target, and also an output value when each initialization signal is output. The output value of the position detecting sensor for outputting the absolute value corresponding to the position is used as the identification information for identifying the initialization signal. The position detecting sensor may be designed to have such a precision level that it can identify the initialization signal, and thus it is unnecessary to use a high-precision and high-resolution. Accordingly, there is little disadvantage that the cost is increased.

(4) The position detecting device is preferably characterized in the invention of (3), a potentiometer or an absolute type encoder may be used as the position detecting sensor.

(5) The position detecting device is preferably characterized in that in the invention of (3), the count value setting means detects the output value of the position detecting sensor when initialization of the count value is started, and moves the control target to a position where an initialization signal identified by the nearest value out of the values of the identification information stored in the current value storage means is output. When the position detecting sensor is used as in the case of (3), the control target can be moved to the nearest position at which the initialization signal is output to initialize the count value by detecting the current value of the control target (which is not necessarily coincident with the original current value) with the position detecting sensor when the initialization of the count value is started. Accordingly, the initialization of the count value can be carried out in a shorter time.

(6) The position detecting device is preferably characterized in that in any one of (1) to (5), it further comprises initial setting means for storing a count value as the current value of the control target into the current storage means along with identification information, the count value concerned corresponding to a count value achieved when an initialization signal is output by the initialization signal output means while moving the control target after the control target is moved to a predetermined position and the count value is set to zero when data to be stored in the current value storage means are created. The present invention is equipped with the means for storing in advance the current value when the initialization signal is output.

(7) The position detecting device is preferably characterized in that the invention according to any one of (1) to (6) is applied to position detection of a control target in a servo device.

(8) The position detecting device is preferably characterized in that the invention according to any one of (1) to (6) is applied to position detection for a pan operation or a tilt operation in a camera platform for supporting a television camera and carrying out the pan operation or the tilt operation on the television camera.

According to the present invention, the position detection is carried out by using the incremental type encoder, and thus the position detection can be performed inexpensively with high precision and high resolution. Furthermore, the initialization of the count value of the encoder can be carried out in a short time.

BRIEF DESCRIPTION OF THE DRAWINGS

FIG. 5 is a diagram showing corresponding data generated in the initialization.

DETAILED DESCRIPTION OF THE INVENTION

Preferred embodiments of a position detecting device according to the present invention will be described hereunder with reference to the accompanying drawings.

Figure 1:
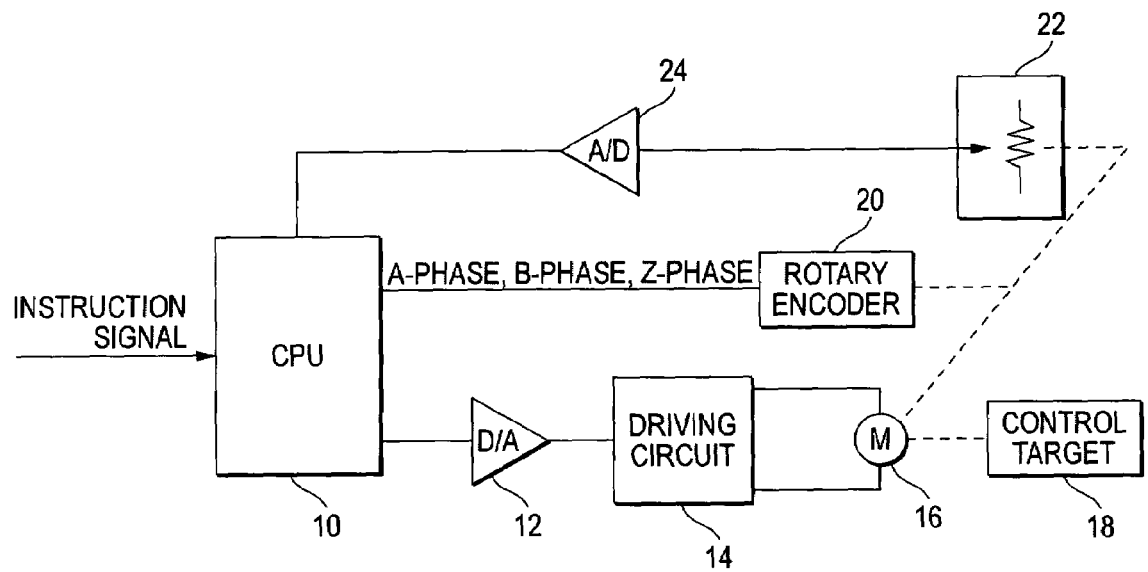
FIG. 1 is a diagram showing one embodiment of the construction of a servo circuit to which the present invention is applied.

FIG. 1 is a diagram showing the construction of a servo circuit to which the present invention is applied. The servo circuit shown in FIG. 1 controls a desired control target 18 by a motor 16, and it sets the position of the control target 18 as a control amount and controls the control target 18 so that the control amount is equal to a target value supplied by an instruction signal. An application range of this servo circuit is not limited to a specific field. Particularly when it is applied to a camera platform system for supporting a television system or television camera, a movable lens group of the television lens, a pan mechanism of the camera platform system, a tilt mechanism, etc. are control targets, and an instruction signal is supplied from a predetermined controller.

In FIG. 1, CPU 10 is supplied with the instruction signal, and a target value indicating a position to which the control target 18 should be moved is given by the instruction signal. A control signal for driving the motor 16 is output from CPU 10 to a D/A converter 12, and the control signal is converted from a digital value to an analog value (voltage value) by the D/A converter 12 and then output to a driving circuit 14. The driving circuit 14 applies the driving voltage corresponding to the voltage of the control signal to the motor 16, whereby the motor 16 is driven in a rotational direction and at a speed, the rotational direction and the speed corresponding to the value of the control signal output from CPU 10. The control target 18 is connected to the output shaft of the motor 16 through a gear train or the like, and operates interlockingly with the motor 16.

Figure 2:
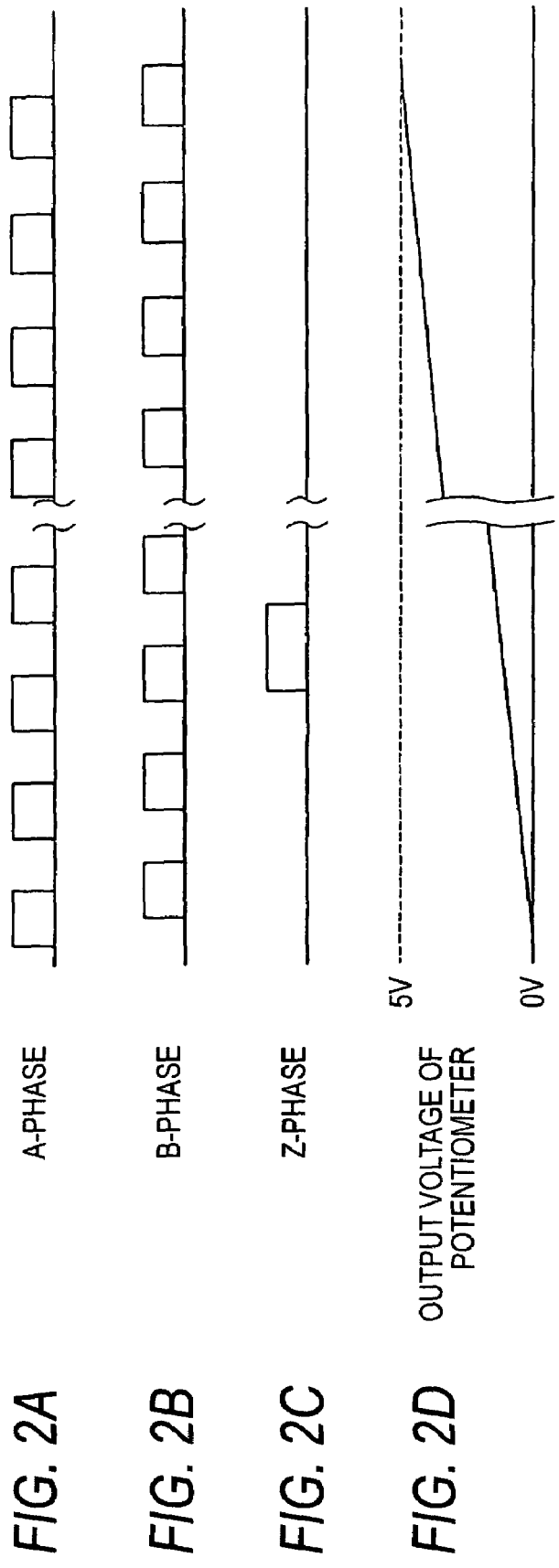
FIGS. 2A to C are diagrams showing output signals of a rotary encoder.
FIG. 2D is a diagram showing an output signal of a potentiometer.

A rotary encoder 20 is an incremental type rotary encoder, and it is provided as a position detecting sensor for detecting the current position of the control target 18 with high precision and high resolution. The rotational shaft of the rotary encoder 20 is connected to rotational shaft of the motor 16 or the control target 18 directly or through a gear train or the like. The output signal of the rotary encoder 20 comprises A-phase, B-phase and Z-phase as shown in FIGS. 2A, 2B, 2C (the abscissa axis represents a rotational angle). For example, as shown in FIGS. 2A and 2B, a predetermined number of pulses per revolution are output from the A-phase and the B-phase every predetermined rotational amount so that the pulses of the A-phase and the B-phase have a phase difference of 90 degrees. Furthermore, as shown in FIG. 2C, one pulse per revolution is output as a zero position signal from the Z-phase. The output signals of these phases which are output from the rotary encoder 20 are supplied to CPU 10.

A potentiometer 22 is a position detecting sensor for detecting a rough position of the control target 18. As described in detail later, it specifies the position of the control target 18 at which the pulse of the zero position signal is output from the Z-phase of the rotary encoder 20, and it is also used to identify the zero position signal output at plural positions (or the positions). The rotational shaft of the potentiometer 22 is connected to the rotational shaft of the motor 16 or the control target 18 directly or through a gear or the like. For example, a voltage from 0V to 5V is substantially linearly output from the potentiometer 22 in accordance with the rotational angle of the rotational shaft as shown in FIG. 2D, and the voltage signal is converted to a digital value by an A/D converter 24 and then supplied to CPU 10.

CPU 10 has the function of a counter, and counts a count value of the counter on the basis of the pulses of the A-phase and the B-phase input to CPU 10. The count value counted by the counter on the basis of the pulses of the A-phase, the B-phase is called as an A/B-phase count value. Here, the phase relationship between the pulses of the A-phase and B-phase is reverse between a case where the rotational shaft of the rotary encoder 20 is forwardly rotated and a case where it is reversely rotated. The counter increments or decrements the A/B-phase count value one by one every time the pulse of A-phase, B-phase is supplied. When the pulse of the A-phase is advanced with respect to the pulse of the B-phase by 90 degrees (in the case of the forward rotation), the A/B-phase count value is incremented. Conversely, when the pulse of the B-phase is advanced with respect to the A-phase by 90 degrees (in the case of the reverse rotation), the A/B-phase count value is decremented.

As described in detail later, when the control target 18 is set at a predetermined position (end), the A/B-phase count value is initialized to zero. Accordingly, the A/B-phase count value at each time point at which the count is carried out by the counter as described above indicates the absolute value corresponding to the position of the control target 18. The A/B-phase count value when the initialization is carried out as described above will be hereinafter referred to as the current value of the control target 18. The value which is achieved by converting the voltage signal output from the potentiometer 22 to the digital signal by the A/D converter 24 and then input to CPU 10 indicates the absolute value corresponding to the current position of the control target 18. However, this value is not required to be made coincident with the A/B-phase count value, and this value will be hereinafter referred to as an A/D conversion value of the potentiometer 22.

CPU 10 sets as the current value of the control target 18 the A/B-phase count value achieved by the counter as described above, successively achieves the control signal of the value corresponding to (for example, proportional to) the difference between the target value given on the basis of the instruction signal and the current value, and outputs the control signal to the D/A converter 12 as described above. Accordingly, the motor 16 is rotated so that the difference between the target value and the current value is reduced, and also the rotational speed of the motor 16 decreases as the difference between the target value and the current value is reduced. The control signal which varies with the variation of the current value is successively supplied from CPU 10 to the driving circuit 14, whereby the control target 18 is moved to the position indicated by the target value and stopped there. Furthermore, when the target value of the instruction signal is varied, the position of the control target 18 is changed in connection with the variation of the target value.

Next, the initializing procedure of the servo circuit thus constructed will be described with reference to the flowchart of FIG. 3. The servo circuit is initialized as desired, for example when products are shipped, the position precision of the control target is lowered or the like. When initialization is executed, for example, a predetermined is pushed to instruct CPU 10 to execute initialization. When the instruction of executing the initialization is supplied to CPU 10, CPU 10 outputs a control signal for rotating the motor 16 in a predetermined direction through the D/A converter 12 to the driving circuit 14, and drives the motor 16 to one end of a rotatable range. That is, CPU 10 moves the control target 18 to one end of the movable range (this end will be hereinafter referred to as a start end) (step S10). Then, it is judged whether the start end is detected or not (step S12). Whether the start end is detected or not may be judged by providing a signal from a sensor (micro-switch, a photointerruptor or the like) for detecting arrival of the control target 18 at the start end) and using the signal. Furthermore, it may be judged by means for detecting that the rotation of the motor 16 is forcedly stopped or the like (the same is applied to detection of a terminal end described below). During the period when NO is judged in this judgment processing, the processing of step S10 and the processing of step S12 are repeated. If YES is judged, the processing is shifted to the processing of the next step S14.

When the control target 18 is designed to be rotatable like a pan mechanism of a camera platform and operable endlessly with no start end and no terminal, a range in which the control target 18 makes one revolution (the range from 0 degree to 360 degrees) is regarded as a movable range of the control target 18, and when the control target is located at predetermined positions, these positions are regarded as a start end and a terminal. In this case, a sensor for detecting the positions of the start end and the terminal is provided, and CPU 10 detects it on the basis of the sensor that the control target 18 moves to the start end and the terminal. However, desired positions may be set to the start end and the terminal without using the sensor as described above. In this case, an operator operates the controller to control the control target 18 so that the control target 18 is set to a desired position serving as an end.

When the control target 18 arrives at the start end and YES is judged in step S12, CPU 10 clears the A/B-phase count value to zero (step S14). Then, CPU 10 alters the value of the control signal output to the driving circuit 14, reverses the rotation direction of the motor 16 to drive the control target 18 to the other end (hereinafter referred to as the terminal), and also starts the count of the A/B-phase count value (step S16).

Subsequently, CPU 10 judges whether a pulse representing the zero position signal is detected in the Z-phase output signal supplied from the rotary encoder 20 (step S18). Here, if NO is judged, it is judged whether the terminal is detected (step S22). If NO is judged, the above processing is repeated from the step S18. That is, the judgment of the step S18 is repeated until the control target 18 arrives at the terminal.

When YES is judged in step S18, CPU 10 associates the A/B-phase count value (D value) at that time with the A/D conversion value (A value) achieved from the potentiometer 22 through the A/D converter 24, and stores them into a built-in memory (step S20). The memory is a non-volatile memory such as EEPROM or the like, and data stored therein are held even when the memory is powered off.

The A/B-phase count value (D value) and the A/D conversion value (A value) of the potentiometer 22 when the pulse of the Z-phase of the rotary encoder 20 is detected are stored in the memory as described above, the processing is shifted to the judgment processing of step S22.

Here, the reduction gear ratio between the rotary encoder 20 and the motor 16 is determined so that the rotary encoder 20 is rotated by at least plural times during the period when the control target 18 moves from the start end to the terminal, and the rotary encoder 20 is connected to the motor 16, etc. so that the above reduction gear ratio is achieved. Accordingly, the pulse of the Z-phase is detected at least twice or more until YES is judged in step S22. Furthermore, the potentiometer 22 is connected to the motor 16, etc. so that it makes substantially one rotation until the control target 18 moves from the start end to the terminal. The frequency of the rotation of the potentiometer 22 during the movement of the control target 18 from the start end to the terminal is not limited to a specific value. However, the A/D conversion value of the potentiometer 22 when the Z-phase pulse is output from the rotary encoder 20 is used as identification information for discriminating the pulse concerned from other pulses. Therefore, if the A/D conversion value of the potentiometer 22 when the Z-phase pulse is output is overlapped with the A/D conversion value when another Z-phase pulse is output in the case where the potentiometer 22 is rotated twice or more during the movement of the control target 18 from the start end to the terminal, these data are invalid as data to be stored in the memory. Accordingly, when there is no reason why the frequency of the rotation of the potentiometer 22 is increased, it is reasonable to set the rotation frequency to once as in the case of this embodiment.

Figure 4:
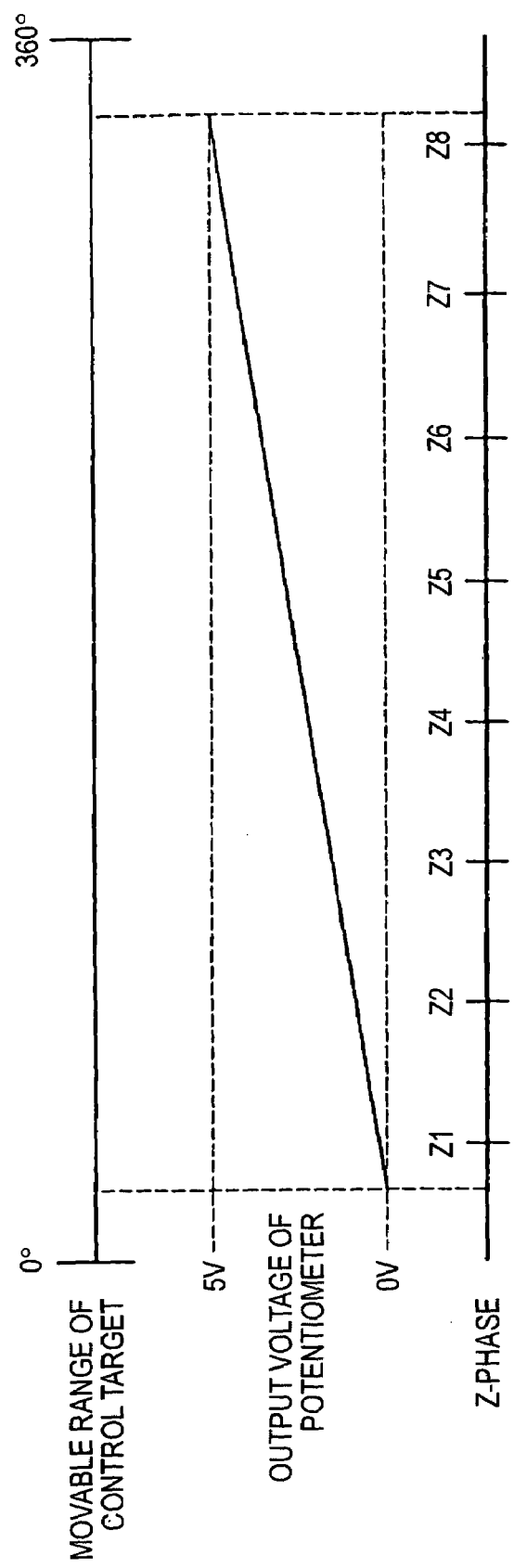
FIG. 4 is a diagram showing an example of an output voltage of the potentiometer and the output timing of a Z-phase pulse with respect to a movable range of a control target.

FIG. 4 is a diagram showing an example of the timing of the Z-phase pulse output from the rotary encoder 20 and the output voltage of the potentiometer 22 during the movement of the control target 18 from the start end to the terminal when the initialization processing is carried out. In this example, the potentiometer 22 is rotated once and the output voltage varies from the minimum value (0V) to the maximum value (5V) during the movement of the control target 18 from the start end to the terminal. However, the position detectable range of the potentiometer 22 is limited to a range of about 340 degrees out of the range of 360 degrees, and thus a portion where the output voltage is unvaried exists in the neighborhood of the start end and the terminal of the control target 18. Furthermore, it is assumed in the example of FIG. 4 that the control target 18 is rotated in the one-rotation range, and the start end is set to 0, and the terminal is set to 360 degrees.

On the other hand, the Z-phase pulse of the rotary encoder 20 is output at each position of the control target 18 which is represented by Z1 to Z8 located at an equal interval. Actually, the Z-phase pulse maybe output in the neighborhood of the start end and terminal of the control target 18 in the range where the output of the potentiometer 22 is unvaried, however, in this case the Z-phase pulse is invalidated. If the rotational amount of the potentiometer 22 is reduced with respect to the movable range of the control target 18 by one rotation or more so that the output voltage of the potentiometer 22 varies over the movable range from the start end to the terminal of the control target 18, the range where the output voltage of the potentiometer 22 is unvaried can be eliminated. In this case, all the Z-phase pulses output in the movable range of the control target 18 can be validated.

CPU 10 reads out the A/D conversion value (A value) of the potentiometer 22 and the A/B-phase count value (D value) and stores them into the memory at each timing of Z1 to Z8 at which the z-phase pulse (valid pulse) is detected. Accordingly, corresponding data as shown in FIG. 5 are generated. The A/B-phase count value (D value) at the position of each of Z1 to Z8 on the assumption that the A/B-phase count value when the control target 18 is located at the start end is set to 0, that is, the current value of the control target 18 stores the A/D conversion vale (A value) of the potentiometer 22 as identification information, for example, like a case where when the A/D conversion value (A value) of the potentiometer 22 is equal to 1000H (H means hexadecimal numeral), the A/B-phase count value (D value) of the rotary encoder 20 is equal to 1500H on the basis of the data achieved when the control target 18 is at the position Z1.

Figure 3:
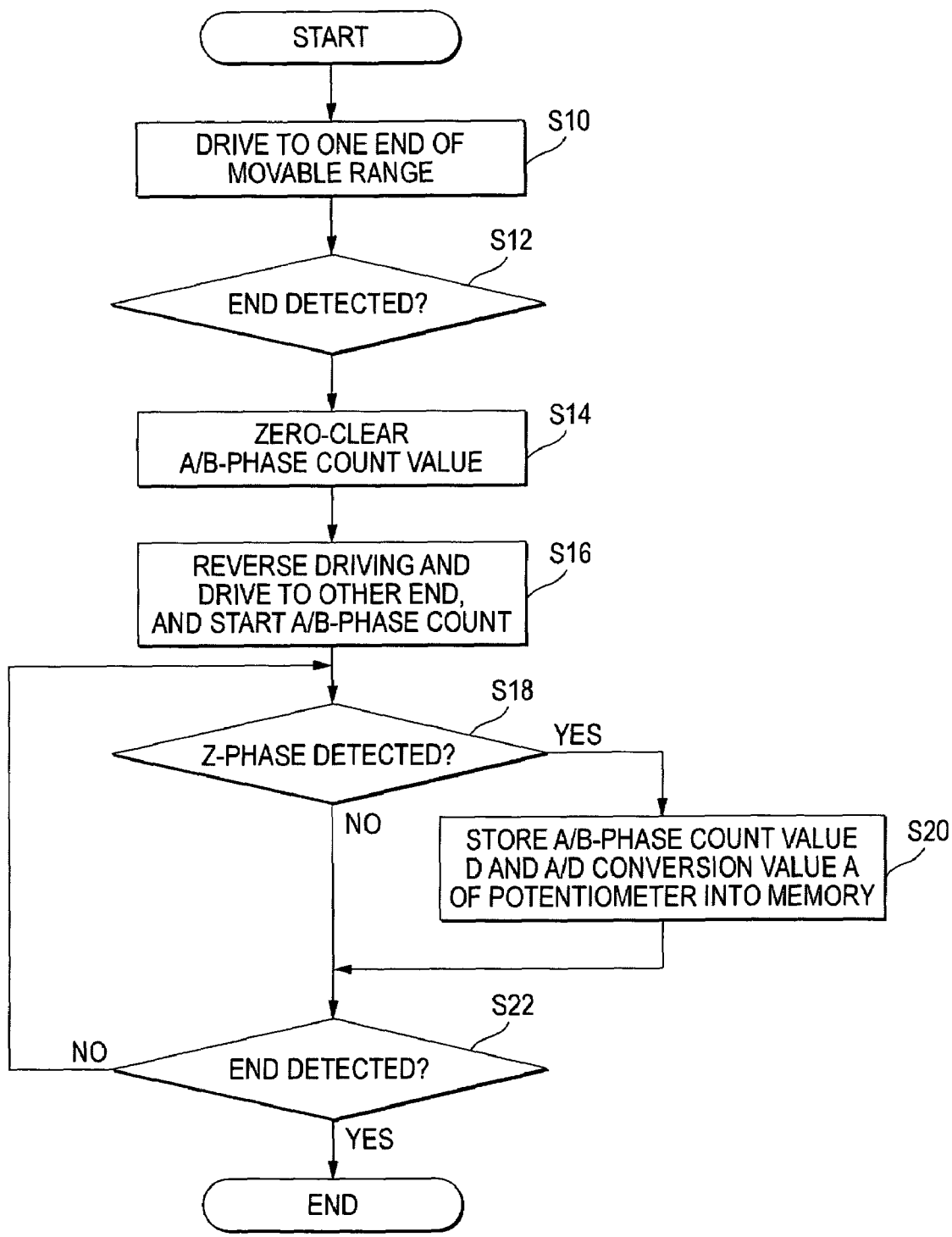
FIG. 3 is a flowchart showing the procedure of initialization.

As described above, the corresponding data are successively generated and stored in the memory while the control target 18 is moved to the terminal, and then when the control target arrives at the terminal and YES is judged in the step S22 of FIG. 3, the initialization is finished.

Next, the procedure of the initialization of the A/B-phase count value at the power-on time when the servo circuit is started to be used will be described with reference to the flowchart of FIG. 6. When power is turned on, CPU 10 reads out the A/D conversion value of the potentiometer 22 (step S30). The position of the control target 18 when power is turned on is set to the position of the control target 18 when the previous use thereof was finished, and thus it is uncertain. Subsequently, CPU 10 compares the current A/D conversion value of the potentiometer 22 detected in step S30 with the A/D conversion value (A value) of the potentiometer 22 stored as the corresponding data in the memory, and it finds out the A value nearest to the current A/D conversion value, specifies a point-blank position at which the Z-phase pulse is output, and also rotates the motor 16 in that direction (step S32). CPU 10 judges whether the pulse representing the zero position signal is detected in the Z-phase output signal supplied from the rotary encoder 20 (step S34). If NO is judged, this judgment is repeated. On the other hand, if YES is judged, the rotation of the motor 16 is stopped at that position, and the D value corresponding to the A value which is set as the nearest value in step S32 is read out from the corresponding data of the memory and set as the A/B-phase count value (step S36). Then, the initialization processing is finished, and subsequently the processing is shifted to the normal processing of driving the motor 16 according to the instruction signal and controlling the position of the control target 18.

As described above, according to the initialization processing, when the A/B-phase count value when the control target is set to the start end is set to zero like the case where the initial setting is carried out, the A/B-phase count value at the position at which the Z-phase pulse is detected in step S34 is reproduced. That is, when the A/B-phase count value when the control target 18 is set to the start end is set to 0 and the A/B-phase count value counted by the pulses of the A-phase and B-phase is represented as the current position indicating the position of the control target 18, the current value at the position at which the Z-phase pulse is detected in step S34 is initialized as the A/B-phase count value. Accordingly, after the initialization, the A/B-phase count value is incremented/decremented from the initialized value on the basis of the pulses of the A-phase and B-phase, whereby the detection of the current value of the control target can be started, and the servo circuit can be effectively used.

Figure 6:
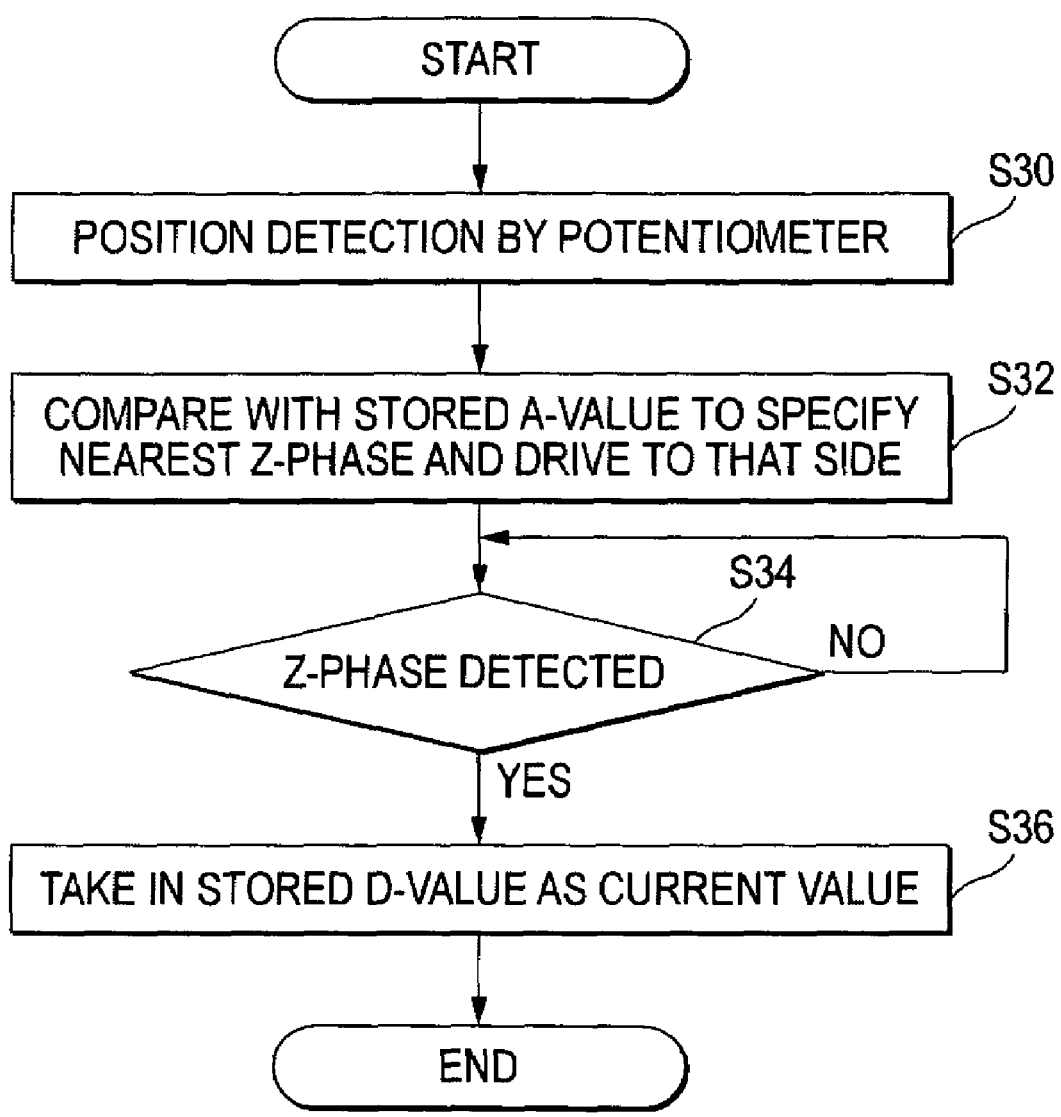
FIG. 6 is a flowchart showing the processing procedure of initialization of an A/B-phase count value.

In the initialization procedure of FIG. 6, after power is turned on (after the initialization processing is started), the A/D conversion value of the potentiometer 22 is first read out, and the A/D conversion value thus read out is compared with the A/D conversion value (A value) of the potentiometer 22 which is stored as the corresponding data in the memory to find out the A value nearest to the current A/D conversion value and move the control target 18 toward the position concerned. However, the present invention is not limited to this embodiment. For example, after power is turned on, the control target 18 may be moved in a desired direction (for example, in a predetermined direction). In this case, after the control target 18 is moved, the A/D conversion value of the potentiometer 232 at the position where the Z-phase pulse is detected is read out, and the A-value of the corresponding data which is coincident with the A/D conversion value concerned is found out. Then, the D value corresponding to the A value may be read out from the corresponding data, and set as the A/B-phase count value.

As described above, in the above embodiment, the movable range of the control target 18 is limited, and it has the start end and the terminal. When the movable range of the control target 18 is not limited, for example when the same state is periodically repeated, an operation range which is integer times as large as the above period is regarded as a movable range, and the initial setting and the initialization processing of the A/B-phase count value can be carried out.

In the above embodiment, the pulse representing the zero position signal of the Z-phase of the rotary encoder 20 is used as the initialization signal representing the initialization position of the A/B-phase counter value. However, the present invention is not limited to this embodiment, and the initialization signal may be output (generated) by another means. For example, a switch, a photointerruptor or other signal generating means which outputs an ON-signal or the like when the control target 18 is moved to a predetermined position corresponding to an initialization position may be disposed at each of plural positions in the movable range of the control target 18, whereby the initialization signal can be output as in the case of the Z-phase pulse.

Still furthermore, in the above embodiment, the Z-phase pulse of the rotary encoder 20 which is output as the initialization signal at plural times in the movable range of the control target 18 is identified, and also the A/D conversion value of the potentiometer 22 is used to specify the Z-phase-pulse outputting nearest position to the position of the control target 18 when power is turned on. However, there may be used a position detecting sensor for outputting the absolute value corresponding to the position of the control target 18 as in the case of an absolute type encoder in place of the potentiometer 22.

Still furthermore, in the above embodiment, the Z-phase-pulse outputting nearest position to the position of the control target 18 when power is turned on is set as the initialization position of the A/B-phase count value, and the control target 18 is moved to the position concerned. However, after power is turned on, the control target 18 may be moved in any direction and the first Z-phase-pulse detecting position maybe set as the initialization position of the A/B-phase count value. In this case, it is unnecessary to specify the Z-phase pulse outputting nearest position to the position of the control target 18 when power is turned on, and plural initialization signals output in the movable range of the control target 18 may be identified. That is, in the above embodiment, the A/D conversion value of the potentiometer 22 is used as the identification information for identifying the Z-phase pulse output at the plural positions of the movable range of the control target 18. At the initialization time, the current value of the control target 18 when each Z-phase pulse (initialization signal) is output in association with the A/D conversion value is stored as the corresponding data in the memory. At the initialization time of the A/B-phase, the current position of the control target which corresponds to the A/D conversion of the potentiometer 22 when the Z-phase pulse is output is read out from the corresponding data of the memory and set as the A/B-phase count value. However, such identification information may be a value other than the A/D conversion value of the potentiometer 22. For example, when signal generating means is provided as means for outputting an initialization signal at plural initialization positions of the movable range of the control target, the initialization signal containing identification information such as the number of the initialization signal or the like maybe generated by the signal generating means.

Still furthermore, as described in the above embodiment, the position detecting device for detecting the position of the control target 18 in the servo circuit may be applicable to circuits other than the servo circuit.

This application is based on Japanese Patent application JP 2004-096450, filed Mar. 29, 2004, the entire content of which is hereby incorporated by reference. This claim for priority benefit is being filed concurrently with the filing of this application.

What is claimed is:

1. A position detecting device for incrementing or decrementing a count value based on a pulse output from an encoder every shift amount of a control target to detect a current value representing a current position of the control target as the count value, the position detecting device comprising:

an initialization signal output unit that outputs an initialization signal representing an initialization position at plural positions within a movable range of the control target when the movable range is restricted, or at plural positions within an operating range of integer times of a period when the movable range is not restricted and a same state is periodically repeated;

a current value storing unit that stores, in association with identification information for identifying each initialization signal, the current value of the control target at each position where the initialization signal is output by the initialization signal output unit; and a count value setting unit that moves the control target to a position where any of the initialization signal is output when the count value is initialized, and achieves the current value corresponding to the identification information for identifying the initialization signal from the current value storage unit, and sets the current value thus achieved as the count value of the current position of the control target.

2. The position detecting device according to claim 1, wherein each initialization signal output from the initialization signal output unit is a zero position signal output from the encoder.

3. The position detecting device according to claim 1, wherein the identification information for identifying each initialization signal output from the initialization signal output unit is an output value of a position detecting sensor for outputting a signal whose value corresponds to the position of the control target when each initialization signal is output.

4. The position detecting device according to claim 3, wherein the position detecting sensor is one of a potentiometer and an absolute type encoder.

5. The position detecting device according to claim 3, wherein the count value setting unit detects the output value of the position detecting sensor when initialization of the count value is started, and moves the control target to a position where an initialization signal identified by the nearest value out of the values of the identification information stored in the current value storage unit is output.

6. The position detecting device according to claim 1, further comprising an initial setting unit that stores a count value as the current value of the control target into the current value storing unit along with identification information when data to be stored in the current value storage unit are created, the count value corresponding to a count value achieved when an initialization signal is output by the initialization signal output unit while moving the control target after the control target is moved to a position and the count value is set to zero.

7. The position detecting device according to claim 1, wherein the position detecting device is applied to position detection of a control target in a servo device.

8. The position detecting device according to claim 1, wherein the position detecting device is applied to position detection for a pan operation or a tilt operation in a camera platform for supporting a television camera and carrying out the pan operation or the tilt operation on the television camera.

9. A position detecting device for detecting a position of a control target, comprising:
a moving unit that moves the control target;
an incremental type encoder that outputs a pulse every shift amount of the control target;
an initialization signal output unit that outputs an initialization signal representing an initialization position at plural positions within a movable range of the control target;
an initial setting unit that sets an absolute position of the control target where the initialization signal is output with a first parameter, wherein a value of the first parameter increases or decreases in conjunction with the pulse;
a detecting unit that sets the position of the control target where the initialization signal is out put with a second parameter, and detects the position of the control target when the position detecting device is started up, wherein a value of the second parameter increases or decreases in conjunction with the pulse; and
a storing unit that stores the value of the first parameter and the value of the second parameter to associate with each other.

10. The position detecting device according to claim 9, wherein when the position detecting device is started up, the storing unit compares the value of the second parameter at a moment thereof detected by the detecting unit with the stored value of the second parameter,
the moving unit moves the control target to a nearest position where the initialization signal is output, and
the storing unit detects the value of the first parameter corresponding to the value of the second parameter of the nearest position.

11. The position detecting device according to claim 9, wherein the initial setting unit performs
moving the control target to one end of the movable range by the moving unit and setting the value of the first parameter to zero; and
storing the value of the first parameter and the value of the second parameter when the initialization signal is out put to associate with each other in the storing unit while moving the control target to an opposite end of the movable range by the moving unit.

12. The position detecting device according to claim 9, wherein the initialization signal is a zero position signal output from the incremental type encoder.

13. The position detecting device according to claim 9, wherein the value of the second parameter is an output value of a position detecting sensor that outputs a signal whose value corresponds to the position of the control target when the initialization signal is output.

14. The position detecting device according to claim 13, wherein the position detecting sensor is one of a potentiometer and an absolute type encoder.

* * * * *